R. L. WESTBY 3,366,956

RADAR SYSTEM AND CIRCUITS FOR USE THEREIN

Filed Jan. 13, 1967

United States Patent Office 3,366,956
Patented Jan. 30, 1968

3,366,956
RADAR SYSTEM AND CIRCUITS FOR USE THEREIN
Ray L. Westby, Ottawa, Ontario, Canada, assignor to Canadian Patents and Development Limited, Ottawa, Ontario, Canada, a corporation of Canada
Filed Jan. 13, 1967, Ser. No. 609,236
16 Claims. (Cl. 343—13)

ABSTRACT OF THE DISCLOSURE

A radar system of special utility as an altimeter of high accuracy (e.g., 5 feet) is disclosed primarily for use in making forest inventories and also useful for making large scale topographic and contour maps. With this accuracy it is important to avoid obtaining readings from the tree tops, rather than the ground proper, and this object is achieved by the use of two circuits that are each directed to detecting the time of occurrence, as nearly as possible, of the peak of a return pulse, rather than of the foot of the leading edge of this pulse. Preferably both these circuits are used in a series arrangement, although it is pointed out that either alone will provide an approximation to the desired result, and indeed that both circuits have utility in themselves outside a radar altimeter.

The altimeter also includes a gate circuit C that ensures that a return pulse is received before it allows a signal corresponding to the emitted pulse to trigger the timing circuit. This prevents the timing circuit remaining triggered but not reinstated, in the event that no return pulse is received.

The altimeter also includes a meter circuit that divides up the full range of the instrument between a number of separate meter movements in a manner whereby the inherent percentage error of each movement is related to only a fraction of the full range, the absolute error thus produced being on the average a smaller percentage error of the full range. This circuit also has general applicability outside radar altimeters.

---

This invention relates primarily to improvements in a radar system for use as an altimeter and also to improvements in various circuits used therein.

As will be more fully explained below, although an entire system has been described in detail, some of the individual circuits used in the full system have utility in their own right, or may be manufactured or sold separately from the other circuits employed to make up the system, for which reason the invention, in the sense of the invention in its broadest scope, consists both of these circuits considered individually as well as of various combinations of such circuits, as set forth in the appended claims.

It is also desired to explain that, whereas the principal utility of the system is expected to be for use as an altimeter (i.e., for distance measurement in the downward vertical direction), the system is equally applicable to use in circumstances where the measurement is taken from a ground point either upwardly or horizontally.

As far as the preferred form of system is concerned, the object of the invention is to provide a radar altimeter of improved accuracy. Radar altimeters are now commonly employed in the making of topographical surveys and contour maps, and as an aid to the various photogrammetric techniques of map making, forest inventory estimates, and related calculations. These endeavours can be made much more meaningful and useful by increased accuracy in the radar altimeter itself, and the principal object of the present system is thus to provide an accuracy of measurement not previously attainable, for example, an accuracy of within about 5 feet in a height measurement somewhere of the order of a few thousand feet. For forest inventory purposes it is expected that measurements will be made from 1,000 to 2,000 feet, but the invention is in no way restricted to use in an aircraft flying at this height above the ground. Accordingly, for the purposes of subsequent explanation and illustration, it will be assumed that an altimeter providing accurate readings within this range is a basic object of the apparatus to be described.

When one begins to deal in heights as small as 5 feet, any vegetation on the ground being surveyed can become a very significant factor. The altitude reading desired will be for the height of the aircraft above the ground proper, that is ignoring the trees and other vegetation thereon; but the return radar pulses reflected from the ground may (depending on the frequency used) include portions reflected by such vegetation. Considered electrically, the effect of the vegetation may be that, even with very sharp-edged outgoing pulses from the transmitter, the reflected pulses received will be relatively less sharp, the extreme leading portion of each return pulse tending to represent reflections from the trees or other above-ground objects. These remarks are true for frequencies between about 2,000 mHz. and 4,800 mHz. Below 2,000 mHz. there will be virtually no energy reflected by the foliage, and above about 4,800 mHz. the energy reflected by the vegetation will tend to approach in magnitude that reflected by the ground.

One of the objects of the altimeter that forms one of the aspects of the present invention is to provide a practical system that permits the use of a frequency in the 2,000 to 4,800 mHz. range, but which at the same time avoids the problems presented by reflections from vegetation. To be able to operate in this range, permits the use of a smaller and lighter antenna than would be required when operating with a frequency below 2,000 mHz., which can be a very significant advantage when the antenna is to be carried in an aircraft, especially a light aircraft.

Thus, assuming operation in the 2,000 to 4,800 mHz. range, the radar reflections from the ground proper will be represented more closely by the peak portion of each return pulse, since the ground will provide a stronger reflected signal than that provided by the vegetation. It follows that, in order to obtain an accurate height measurement from the ground proper under these conditions, the altimeter ideally should not provide a temporal comparison between each outgoing pulse and the leading portion of the return pulse, but between the sharp leading edge of each outgoing pulse and, as nearly as possible, the peak portion of the associated return pulse. This result is required to be attained, moreover, even in the face of the substantial variations in the magnitude of such return pulses that are inevitably to be expected in practice.

For this reason, a further one of the objects of the present invention is the provision of a circuit for isolating a signal representative of a peak portion of a pulse, from which such temporal comparison can be made. Two such circuits are described below, and each serves to provide an approximation towards the ideal of measuring the time of occurrence of the exact tip of the pulse peak. In the preferred apparatus to be described both such circuits are employed, arranged effectively in series with each other, so as to achieve their combined advantages. It will, however, be apparent that one or other of these circuits may be used alone, depending on the degree of accuracy required. Either circuit alone provides improved performance over the circuits employed in prior radar altimeters and, therefore, their combined use will be seen to be more in the nature of a striving for a maximum advantage than an essential feature of the invention. Moreover, such circuits obviously can each have utility alone, i.e., for use in some environment other than a radar altimeter whether the issue of importance for determination is the time of occurrence of the peak rather than of the foot of the leading edge of a pulse.

Detection of the pulse peak, rather than the pulse foot, has other advantages beyond avoiding the altimeter tending to give a reading corresponding to the distance of the tree tops. It also effectively narrows the radar beam in the sense that it tends automatically to discount reflections of minor amplitude that are received from parts of the ground or from other objects that lie to one side of the beam axis. In present radar altimeters spurious readings representing reflections from ground surfaces located towards the edges of the radar beam are often obtained and these can only reduce the reliability of the instrument. Furthermore, this effective narrowing of the beam enables a reduction in size of the antenna, quite apart from the reduction inherent in the ability to operate with accuracy in the relatively high frequency region above 2,000 mHz.

It is, of course, always necessary to avoid the timing circuit reacting to noise, a problem that is normally tackled in radar altimeters by selecting a threshold voltage value above the maximum noise level. The timing circuit is then set to react to this threshold voltage, which is neither the peak of the pulse nor the true foot of the leading edge of the pulse. Moreover, the temporal relationship between this threshold point on the leading edge of the pulse and the other parts of such leading edge is essentially indeterminate, because such relationship is a function of the slope of the leading edge, which slope can and does vary substantially from one terrain to another.

Another important advantage of detection of the return pulse peak, in contrast to detection of its foot, is that such arrangement enables the transmitted pulse to have a less sharp leading edge than would otherwise be necessary. The nearer the leading edge of a pulse approaches a truly rectangular condition, the greater the band width of frequencies involved becomes. Consequently, the ability to use a less steep leading edge for the transmitted pulse has many advantages both in the transmitter and the receiver. From the viewpoint of the best frequency spectrum, the preferable shape for the transmitted pulse is gaussian. While a less steep leading edge would normally mean less accuracy, this is no longer so when the temporal measurement of the return pulse is related to its peak, as in the present system. Since the time interval between the foot and the peak of the transmitted pulse will be constant, its effect can be eliminated during calibration of the instrument. The effect of the time interval between the foot and the peak of the return pulse, which time interval is not constant, being dependent on the height of vegetation, is eliminated by the particular manner in which the present circuits detect the peak and ignore the foot of the return pulse.

As will appear more clearly from the specific description that follows, the altimeter system provided by way of illustration of the many facets of the present invention, includes other circuits of general applicability and utility.

For example, there is described a gate circuit that serves to ensure that the timing circuit is only energised by a signal representative of each outgoing pulse emitted, after it has been determined that a corresponding return pulse has been received. This arrangement prevents the timing circuit being triggered by a transmitted pulse only to be left indefinitely in its triggered state without reinstatement by a return pulse that may never appear; or to be reinstated much later by a return pulse corresponding to a subsequently emitted pulse, a result that would of course yield an entirely false height reading.

There is also described a meter circuit that employs a plurality of meter movements for displaying the output reading in a manner that has the effect of relating the inherent percentage error of each movement to only a fraction of the total range covered by the instrument and of making the absolute error so calculated apply to the entire range, although it will then be on the average a smaller percentage error of the full range than the percentage error of each individual movement. This latter meter circuit will obviously have utility in many instruments in which an output voltage is applied to a meter movement to provide a visual or recordable output reading, and the circuit is therefore in no way restricted to use in a radar altimeter, although it is a circuit that is especially well adapted to the present altimeter system.

These and other features of the various aspects of the present invention will be more fully and clearly understood from the specific description that follows, such description providing merely an example of the present invention and being intended to be read in conjunction with the appended drawings.

Figure 1:
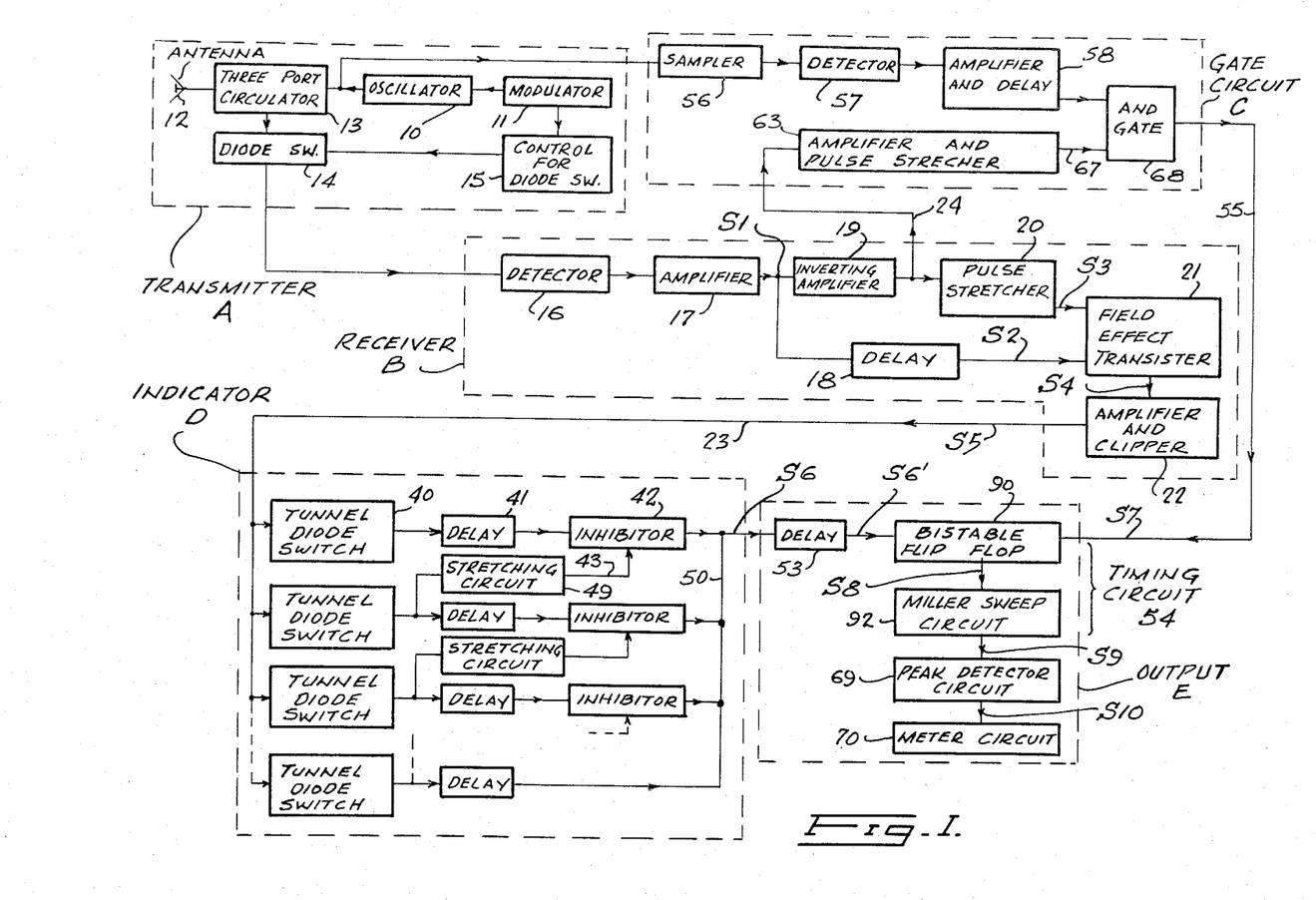
FIGURE 1 is a block diagram of the entire circuit.

The circuit of FIGURE 1 shows all the main components of the radar altimeter, which components form five main groups, namely a transmitter A, a receiver B, a gate circuit C, an indicator D and an output E.

The transmitter A is conventional and hence no details thereof beyond those shown in FIGURE 1 are deemed necessary. It consists of a conventional oscillator 10 (e.g., 4,200 mHz., a frequency allotted to aeronautical navigation) and a conventional modulator 11 for controlling the pulse repetition frequency (e.g., 2,000) and the pulse length (e.g., 0.4 $\mu$secs.). The oscillator 10 feeds to the antenna 12 through a conventional three port circulator 13. Return signals received at the antenna 12 are fed to the receiver B by a conventional diode switch 14 operated by a control 15 coupled to the modulator 11 in the conventional manner.

In the receiver B, the received signal is first detected in a conventional (e.g., crystal) detector 16 and passed to amplifier 17, at the output of which the circuit divides into two paths. One path comprises a delay 18; the other comprises an amplifier 19 and pulse stretcher 20 in series, a connection 24 extending from between the amplifier 19 and pulse stretcher 20 to the gate circuit C. The two paths then rejoin as the inputs to a field effect transistor 21, the output of which passes to a conventional amplifier and clipper 22, and hence to the indicator D via connection 23.

Figure 2:
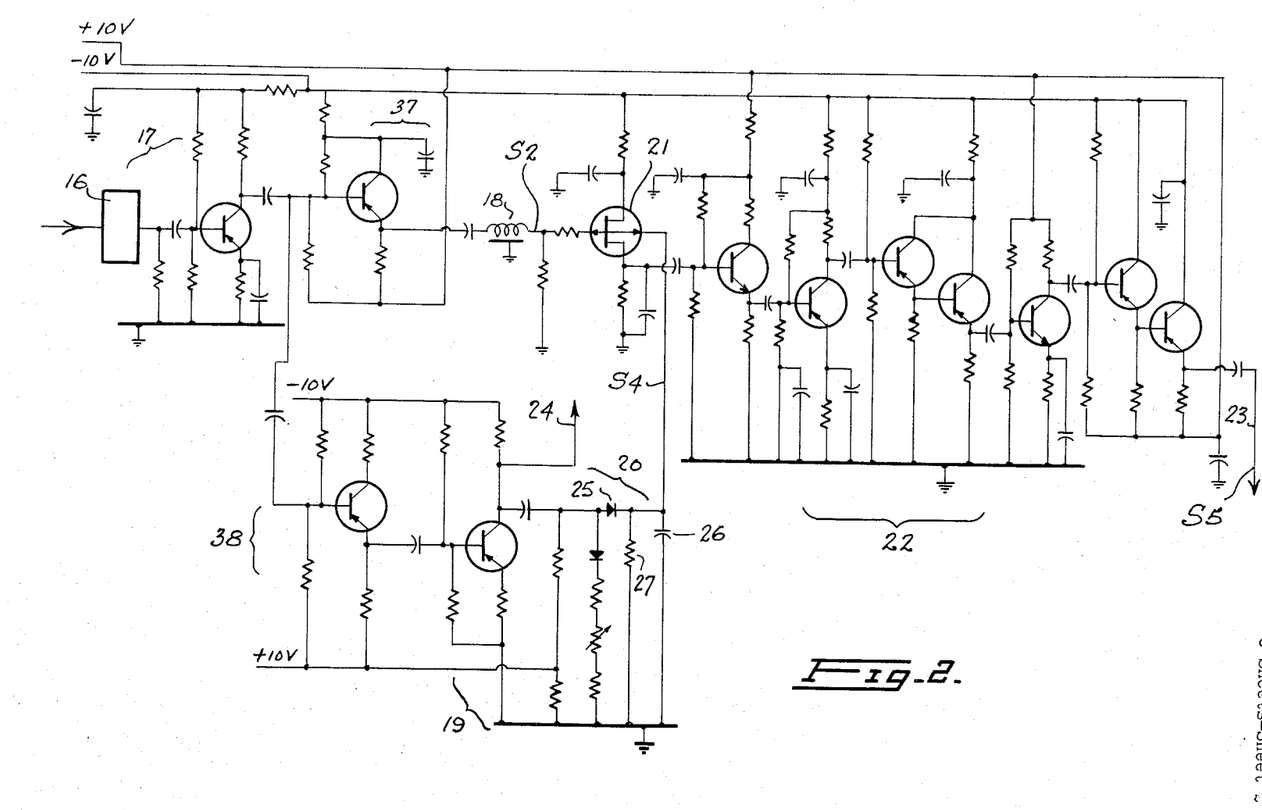
FIGURE 2 is a more detailed circuit diagram of the receiver.

Details of a typical circuit for the receiver B are shown in FIGURE 2, the various transistor stages being conventional in themselves and not requiring specific analysis. In addition to the main components illustrated in block form in FIGURE 1, the circuit of FIGURE 2 shows conventional emitter followers 37 and 38 preceding the delay 18 and the amplifier 19 respectively. The operation of the receiver B will best be understood with the help of the pulse diagrams of FIGURE 7 which show the signals (pulses) S1 to S5 as they appear at the respective outputs of the amplifier 17, delay 18, pulse stretcher 20, field effect transistor 21 and amplifier and clipper 22. Signal S1 is essentially the reflected signal as received back from the ground, and the pulse S2 is the same signal with a fixed delay, for example, 0.5 $\mu$secs. Signal S3 has been inverted by the amplifier 19 and then stretched by the purse stretcher 20 which, in practice, consists of a rectifier 25, a capacitor 26 and resistor 27 (FIGURE 2). Signals S2 and S3 are combined in the transistor 21 to generate the signal S4 which is then amplified and all negative portions clipped to produce the output signal S5 of the receiver. What has, in effect, been achieved is to produce a signal S5 which corresponds to the peak portion only of the signal S2, i.e., that portion above the line 28, and hence to the peak portion of the signal S1 above the line 29. Thus the point 30 at which the signal S5 begins is timed exactly 0.5 $\mu$secs. after the point 31 on the signal S1, rather than being so temporally related to the point 32 at which the signal S1 commences.

Figure 4:
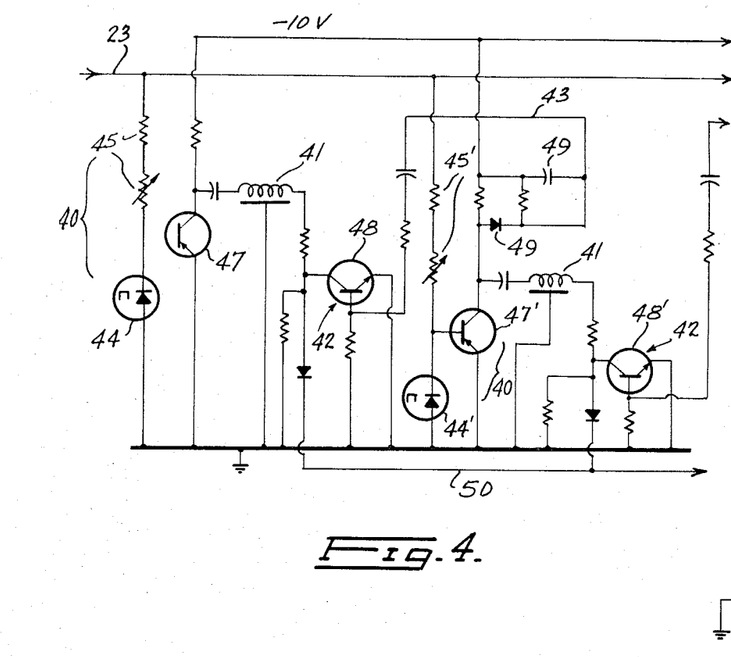
FIGURE 4 is a typical portion of the indicator circuit.

The signal S5 passes to the indicator D (FIGURE 1) which consists of a number ($n$) of stages, each of which, except the last, consists of a voltage level detector in the form of a tunnel diode switch 40, a delay 41 and an inhibitor 42, in series, while the last stage consists of only a tunnel diode switch 40 and a delay 41. The output of each tunnel diode switch 40 is also connected by a lead 43 to the inhibitor 42 of the previous stage through a stretching circuit 49. As many stages as desired may be employed; the more stages the greater the accuracy. In practice, about seven or eight stages will normally be sufficient. FIGURE 1 shows the first three stages and the last ($n$th) stage in block diagram form, and FIGURE 4 shows the first two stages in more circuit detail. The latter view shows a first tunnel diode 44, across which the signal S5 is applied through resistors 45, the value of which will be adjusted to cause the tunnel diode 44 to pass the first peak of its characteristic curve as soon as the signal S5 reaches a first level 46 (FIGURE 7) and hence suddenly increase its effective resistance to generate an output signal in the form of a positive pulse applied to the base of a switching transistor 47, hence turning this transistor on into its conducting state. The output from this transistor 47 passes through the delay 41 to the inhibitor 42 which takes the form of a normally non-conducting transistor 48.

Figure 7:
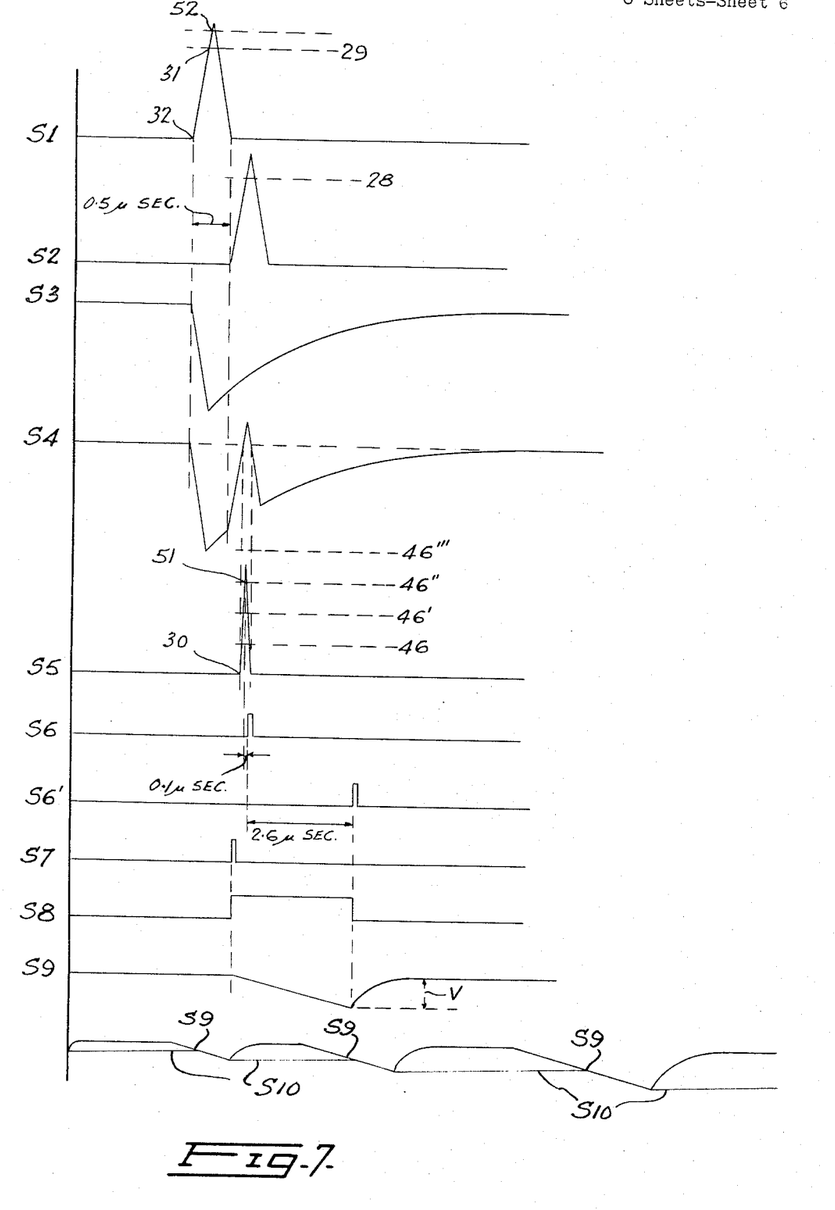
FIGURE 7 shows a number of pulse diagrams.

In the second stage, a tunnel diode 44', resistor 45' and transistors 47' and 48' correspond to the already described components of the first stage, the difference being that the resistors 45' are adjusted to be of larger value than the resistors 45 so that the tunnel diode 44' does not switch on the transistor 47' until the signal S5 has reached a higher level, e.g., 46'. Assuming that this happens, the transistor 47' will transmit a positive-going pulse through the lead 43 to switch on the transistor 48. This action will commence before the transistor 48 receives a pulse from the first stage, because of the delay 41, and will remain in operation for a substantial time, because of the presence of the stretching circuit 49. As a result, when a pulse is received from the transistor 47, the transistor 48 will be conducting and will act to short the signal to ground, thus inhibiting its appearing on the output line 50.

As is best appreciated from FIGURE 1, this inhibiting action will be exerted by each successive stage on the immediately preceding stage, until a stage is reached at which the resistor setting is too high (e.g., level 46''') to be reached by the signal S5. When this happens, no inhibition of the previous stage occurs and an output signal S6 appears on the circuit output line 50, such signal S6 corresponding temporally to the point 51 at which the signal S5 reached the highest of the set levels (e.g., 46'') that it was able to attain, plus the delay 41 (e.g., 0.1 $\mu$secs.). It will be seen that, in this way, the output signal S6 bears a predetermined time relationship (e.g., 0.6 $\mu$secs. delay) to the point 52 on the original input pulse S1, which point 52 is very nearly the tip of the peak portion of that pulse.

The signal S6 passes to the output E through a further delay 53 (e.g., 2.6 $\mu$secs.), such delay being provided for a purpose that will shortly be explained. From the delay 53, the delayed signal S6' is supplied as one input to a timing circuit 54, the other input S7 of which arrives through a connection 55 from a gate circuit C, the nature of which will now be described.

The gate circuit C performs two functions: to provide a time datum for the transmitted pulses to feed to the timing circuit 54 for comparison with the reflected pulses; and to ensure that the timing circuit 54 will not be actuated at all, if no reflected pulse is received. For this purpose the gate circuit C, as shown in FIGURE 1, consists essentially of a conventional sampler 56 connected to the output of the oscillator to take a small sample of the transmitted energy and a conventional detector 57 to detect each outgoing pulse. The detector 57 feeds to an amplifier and delay network 58 which actually consists of a first delay 59 (FIGURE 3), e.g., 2 $\mu$secs., an amplifying stage 60, a second delay 61, e.g., 2.6 $\mu$secs. and a further amplifying stage 62.

Figure 3:
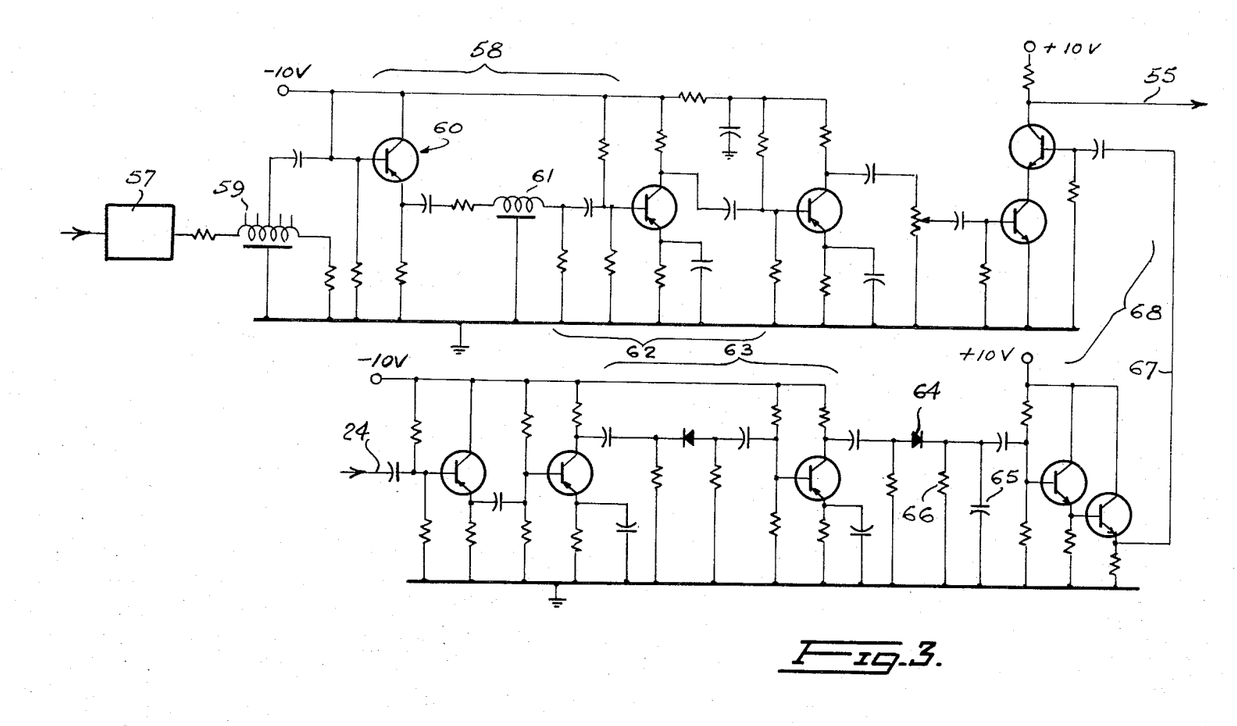
FIGURE 3 is a more detailed circuit diagram of the gate circuit.

The gate circuit C also contains a pulse amplifier and stretcher 63 that receives an inverted form of the signal S1 via the connection 24, and amplifies, inverts and stretches it, the latter function being performed by a circuit comprising a rectifier 64, a capacitor 65 and a resistor 66. The output from the pulse amplifier and stretcher 63 is applied via a lead 67 to one input of an AND gate 68, the other input to which is received from the amplifier and delay 58. The transmitted signal received by this latter path will have been delayed a total of, for example, 4.6 $\mu$secs., which corresponds to about 2,300 feet of altitude. This altitude is assumed to be above the maximum designed operating range of the altimeter (if it were not, the delay would be increased to correspond to a value greater than the maximum operating height). Thus, if a reflected pulse is to be received, it will have already been received by this time and will be applied to the AND gate 68 as a stretched pulse via lead 67. Then, when the delayed transmission pulse arrives, the AND gate 68 is actuated to emit an output pulse S7 on line 55 (FIGURE 7). This pulse S7 will have a sharply defined leading edge and will bear a predetermined time relationship (e.g., 4.6 $\mu$secs. delay) to the transmitted pulse. It will trigger a bistable flip-flop 90 to the timing circuit 54, the output S8 of the flip-flop 90 starting a Miller sweep circuit 92. The flip-flop 90 will be reset by the delayed signal S6', which latter will be delayed behind the transmitted pulse, in the example given, by 3.2 $\mu$secs. plus the transmission time between the aircraft and the ground. Since the signal stopping the timing circuit must arrive after that starting it, the altitude must be at least enough to give a 1.4 $\mu$sec. delay, i.e., about 700 to 800 feet. As explained above, a typical instrument might conveniently be calibrated to operate within the range of 1,000 to 2,000 feet, although to change this range, it is only necessary to change the constants of the circuits. The flip-flop 90, when reset, stops the Miller sweep circuit 92, so that the latter emits an output S9 which will reach a voltage V proportional to the length of time the flip-flop 90 was switched on. The total output of the Miller sweep circuit 92 will take the form of a large number of separate pulses S9, one for each measurement taken, e.g., 2,000 per second, and a conventional peak detector circuit 69 is provided to yield a D.C. output voltage S10. This voltage is negative, and becomes increasingly negative with increasing average length of the pulses S9, i.e., the length of time during which the timing circuit 54 was switched on during each measurement. The voltage S10 decays slowly between each pulse S9, to enable it to follow the peaks of these pulses when they are diminishing in amplitude.

Figure 5:
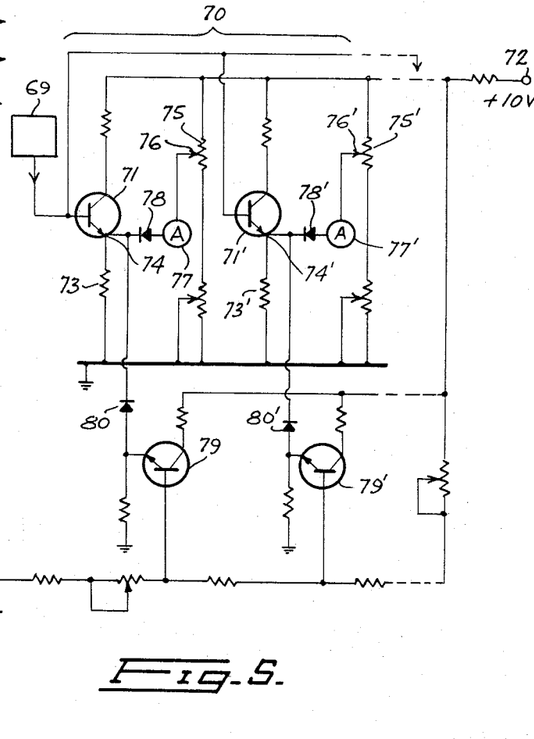
FIGURE 5 is a typical portion of the meter circuit.

The voltage 10 is then passed to a meter circuit 70 to yield a direct reading in altitude. While the meter circuit 70 may be a known form of D.C. volt meter, it is preferred to employ the novel circuit shown in part in FIGURE 5. This circuit may conveniently consist of five similar stages, only two of which are shown in FIGURE 5. The first stage includes a transistor 71, the bias of which is controlled by the D.C. voltage received from the output circuit 69. A positive potential of say 10 volts is applied at terminal 72, and, in the absence of a voltage at the base of the transistor 71, the latter will conduct to ground through a resistor 73. As a result, the point 74, i.e., the transistor emitter is at a positive voltage of say 9 volts. The positive potential from terminal 72 is also applied across a potential divider 75, the adjustable tap 76 of which is connected to a 1 milliamp ammeter 77 and through a rectifier 78 to the point 74. Assuming that the voltage at the tap 76 is say +8 volts, no current will flow from it through the ammeter 77 to the point 74 which is at +9 volts, since the rectifier 78 will be back biased. However, as the voltage from the output circuit 69 increases in value, i.e., becomes more negative, with an increasing value of height detected by the timing circuit 54, the transistor 71 begins to be back biased and gradually to present a greater impedance, so that the potential at point 74 begins to fall below that of the tap 76 and a current flows in the ammeter 77 proportional to the increase in negative value of the output of the circuit 69. This effect continues until the ammeter movement has been deflected full scale, at which time the point 74 will have reached a value of say +7 volts. Regardless of how much further the negative value of the bias voltage applied to the transistor 71 may increase, the current through the ammeter 77 cannot increase above approximately its full scale value, because under these conditions a fuurther transistor 79 takes over to prevent the voltage at point 74 falling further. The positive supply terminal 72 is connected to the collector of the transistor 79 and its emitter is connected through rectifier 80 to the point 74. The bias on the base of the transistor 79 is adjusted to cause the sample to exhibit an impedance such that it prevents the potential of the point 74 falling below a certain value, in the present example, +7 volts. Any attempt by the point 74 to assume a lower voltage will be prevented by a boosting of such voltage by the transistor 79. Consequently, the movement of the ammeter 77 moves up to full scale and stays there without being overstressed, as demonstrated by the pointer 81 in FIGURE 6. This arrangement enables this scale 82 to be calibrated for only a fraction, say a fifth, of the total range of the instrument. For example, if the instrument is to record heights between 1,000 feet and 2,000 feet, the scale 82 of the ammeter 77 might read from 1,000 feet to 1,200 feet, as shown in FIGURE 6.

The second stage of the meter circuit 70 will be essentially the same as the first, comprising control transistor 71', resistor 73', point 74', potential divider 75' with tap 76', milliammeter 77', rectifier 78', voltage limiting transistor 79' and rectifier 80'. In this instance, however, the settings of the tap 76' and of the bias on the base of the transistor 79' are different, so that the point 74' will have to fall to a lower value (e.g., +7 volts) than in the first stage before current will flow in the rectifier 78' and current will flow in the ammeter 77'. The transistor 79' will also limit the fall in the potential of point 74' to a lower value, e.g., +6 volts, so that the second ammeter 74' will, in effect, take over where the first ammeter left off, and may, for example, be calibrated to read heights of 1,200 feet to 1,400 feet. The subsequent stages will be similar in structure and function and will in turn be calibrated to be effective over subsequent portions of the total range of the instrument in the manner illustrated in FIGURE 6 which shows the pointers 81 and 81' of the first two stages deflected full scale, with the pointer 81'' of the third stage partially deflected to indicate a height of about 1525 feet. The pointers of the fourth and fifth stages will be undeflected under these conditions.

Figures 6, 8:
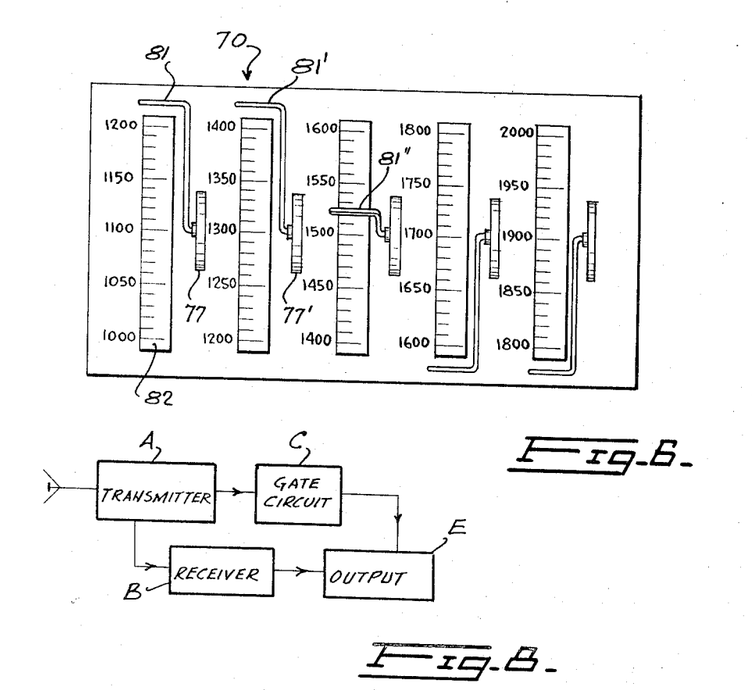
FIGURE 6 is a view of an arrangement of meter scales.
FIGURES 8 and 9 show block diagrams of alternative arrangements.

An important advantage of the arrangement of FIGURES 5 and 6, apart from the convenience of dividing the scale into five portions and the consequent ability to graduate the same finely, resides in the fact that any error in the indicator will be small and relatively independent of the value being indicated. For example, should the maximum error in each ammeter movement be 1%, then this error will be equal to a reading of 2 feet on each of the scales, since each has a range of 200 feet. This is in contrast to an arrangement in which a single ammeter movement is used, where, if the maximum error were 1%, the actual error could reach a value of 10 feet at the upper range of a scale calibrated for 1,000 feet.

As was mentioned above, the two circuits (Receiver B and Indicator D) need not necessarily be used together, although this is preferred. The output from the Receiver B can be passed directly to the Output E in the manner shown in FIGURE 8 (with suitable modification to the values of the delay elements), whereupon the timing circuit will be reinstated by the point 31 rather than the point 52, a sacrifice in accuracy that may sometimes be acceptable.

Figure 9:
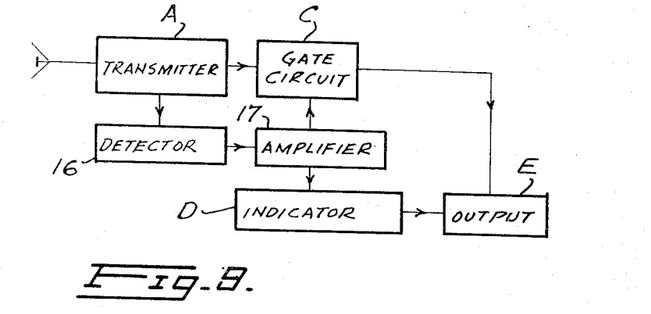

Conversely, the Receiver B, or at least those parts of it concerned with generating the signal pulses S2 to S5 may be omitted, the output of amplifier 17 being fed directly to the Indicator D in the manner shown in FIGURE 9. The Indicator D will then effectively scan upwardly along the leading edge of the full pulse S1 rather than along the peak portion S5 thereof. The result will, of course, be a coarser stepping with reduced accuracy, unless the number of stages in the Indicator D were increased to compensate therefor.

I claim:
1. A circuit for isolating a signal representative of a peak portion of an input pulse, comprising:
  (a) input means for receiving an input pulse,
  (b) a first circuit path connected to said input means to receive said input pulse, said path including delay means for generating a first output pulse substantially the same as said input pulse but delayed in relation thereto,
  (c) a second circuit path connected to said input means to receive said input pulse, said second path including inverting means and pulse stretching means for generating a second output pulse with a polarity inverted relative to said input pulse and with a trailing edge having a decay gradual relative to that of the input pulse,
  (d) means for mixing said first and second output pulses together to form a composite pulse a major portion of which is of the same polarity as said second output pulse, while a minor portion of which is of the same polarity as said first output pulse, said minor portion corresponding to the peak portion of said first output pulse,
  (e) and polarity sensitive means connected to said mixing means for receiving said composite pulse and for selecting said minor portion therefrom to form a third output pulse representative of the peak portion of said input pulse.

2. A circuit according to claim 1, for generating an output having a predetermined temporal relationship to the moment of occurrence of substantially the tip of said peak portion, said circuit further comprising:
  (f) a plurality ($n$) of voltage level detectors each connected to said means (e) to receive said third output pulse and each including means adjusted successively from 1 to $n$ to generate an output signal upon detection of a progressively greater voltage level,
  (g) a plurality ($n$) of delay devices each connected to a respective detector to receive a said output signal therefrom and each having output means to provide a further output signal delayed in relation to the output signal of its associated detector,
  (h) a plurality ($n-1$) of stretching circuits each connected to a respective detector except the first detector adjusted for detecting the smallest voltage level, to receive a said output signal therefrom, and each having output means to provide an output signal stretched at least as long temporally as said further output signals are delayed in relation to said detector output signals, (i) a plurality (n−1) of inhibitor devices each having first and second input means, said first input means being respectively connected to receive a said further output signal from each of said delay devices except from the nth delay devices connected to the nth detector device adjusted for detecting the greatest voltage level, and said second input means being respectively connected to receive a said stretched output signal from each of said stretching circuits, each successive said second input means being connected to a stretching circuit receiving a said detector output signal from a detector adjusted to a progressively greater voltage level, (j) each said inhibitor device having output means for generating an output signal on receipt of a signal at said first input means only in the absence of a signal at said second input means, (k) and circuit output means connected to the output means of each of said inhibitor devices and to the output means of said nth delay device.

3. A circuit for generating an output having a predetermined temporal relationship to the moment of occurrence of substantially the tip of a pulse, said circuit comprising:

(a) a plurality (n) of voltage level detectors each connected to receive said pulse and each including means adjusted successively from 1 to n to generate an output signal upon detection of a progressively greater voltage level, (b) a plurality (n) of delay devices each connected to a respective detector to receive a said output signal therefrom and each having output means to provide a further output signal delayed in relation to the output signal of its associated detector, (c) a plurality (n−1) of stretching circuits each connected to a respective detector except the first detector adjusted for detecting the smallest voltage level, to receive a said output signal therefrom, and each having output means to provide an output signal stretched at least as long temporally as said further output signals are delayed in relation to said detector output signals, (d) a plurality (n−1) of inhibitor devices each having first and second input means, said first input means being respectively connected to receive a said further output signal from each of said delay devices except from the nth delay device connected to the nth detector adjusted for detecting the greatest voltage level, and said second input means being respectively connected to receive a said stretched output signal from each of said stretching circuits, each successive said second input means being connected to a stretching circuit receiving a said detector output signal from a detector adjusted to a progressively greater voltage level, (e) each said inhibitor device having output means for generating an output signal on receipt of a signal at said first input means only in the absence of a signal at said second input means, (f) and circuit output means connected to the output means of each of said inhibitor devices and to the output means of said nth delay device.

4. A radar system for accurate determination of distance from a target proper, in contrast to vegetation or the like thereon, comprising:

(a) a radar transmitter including an antenna for directing outgoing pulses, (b) receiving means for detecting return pulses less sharp than the outgoing pulses, the peaks of which return pulses represent reflection from the target proper, (c) a timing circuit for determining the time interval between receipt of two input signals, (d) means connected to said transmitter and to said timing circuit for detecting said outgoing pulse and for impressing on said timing circuit a first input signal having a predetermined temporal relationship to the leading edge of said outgoing pulse, (e) and means connected to said receiving means and to said timing circuit for detecting a point near the tip of a said return pulse and for impressing on said timing circuit a second input signal having a predetermined temporal relationship to said point, (f) said timing circuit having an output signal proportional to the time interval between said input signals, whereby said output signal is representative of the distance of the system from the target proper.

5. A radar system according to claim 4, wherein said means (e) comprises:

(g) input means for receiving from said receiving means an input pulse corresponding to a said return pulse, (h) a first circuit path connected to said input means to receive said input pulse, said path including delay means for generating a first output pulse substantially the same as said input pulse but delayed in relation thereto, (i) a second circuit path connected to said input means to receive said input pulse, said second path including inverting means and pulse stretching means for generating a second output pulse with a polarity inverted relative to said input pulse and with a trailing edge having a decay gradual relative to that of the input pulse, (j) means for mixing said first and second output pulses together to form a composite pulse, a major portion of which is of the same polarity as said second output pulse, while a minor portion of which is of the same polarity as said first output pulse, said minor portion corresponding to the peak portion of said first output pulse, (k) and polarity sensitive means connected to said mixing means for receiving said composite pulse and for selecting said minor portion therefrom to form a third output pulse representative of the peak portion of said input pulse, (l) and means for passing said third output pulse to said timing circuit as the second input signal thereof.

6. A radar system according to claim 4, wherein said means (e) comprises:

(g) a plurality (n) of voltage level detectors each connected to receive a said return pulse and each including means adjusted successively from 1 to n to generate an output signal upon detection of a progressively greater voltage level, (h) a plurality (n) of delay devices each connected to a respective detector to receive a said output signal therefrom and each having output means to provide a further output signal delayed in relation to the output signal of its associated detector, (i) a plurality (n−1) of stretching circuits each connected to a respective detector except the first detector adjusted for detecting the smallest voltage level, to receive a said output signal therefrom, and each having output means to provide an output signal stretched at least as long temporally as said further output signals are delayed in relation to said detector output signals, (j) a plurality (n−1) of inhibitor devices each having first and second input means, said first input means being respectively connected to receive a said further output signal from each of said delay devices except from the nth delay device connected to the nth detector device adjusted for detecting the greatest voltage level, and said second input means being respectively connected to receive a said stretched output signal from each of said stretching circuits, each successive said second input means being connected to a stretching circuit receiving a said detector output signal from a detector adjusted to a progressively greater voltage level, (k) each said inhibitor device having output means for generating an output signal on receipt of a signal at said first input means only in the absence of a signal at said second input means, (l) and means connecting the output means of each of said inhibitor devices and the output means of said nth delay device to said timing circuit to provide the second input signal thereof.

7. A radar system according to claim 4 wherein said means (e) comprises:

(g) input means for receiving from said receiving means an input pulse corresponding to a said return pulse, (h) a first circuit path connected to said input means to receive said input pulse, said path including delay means for generating a first output pulse substantially the same as said input pulse but delayed in relation thereto, (i) a second circuit path connected to said input means to receive said input pulse, said second path including inverting means and pulse stretching means for generating a second output pulse with a polarity inverted relative to said input pulse and with a trailing edge having a decay gradual relative to that of the input pulse, (j) means for mixing said first and second output pulses together to form a composite pulse a major portion of which is of the same polarity as said second output pulse, while a minor portion of which is of the same polarity as said first output pulse, said minor portion corresponding to the peak portion of said first output pulse, (k) and polarity sensitive means connected to said mixing means for receiving said composite pulse and for selecting said minor portion therefrom to form a third output pulse representative of the peak portion of said input pulse, (l) a plurality of (n) of voltage level detectors each connected to said means (k) to receive said third output pulse and each including means adjusted successively from 1 to n to generate an output signal upon detection of a progressively greater voltage level, (m) a plurality (n) of delay devices each connected to a respective detector to receive a said output signal therefrom and each having output means to provide a further output signal delayed in relation to the output signal of its associated detector, (n) a plurality (n—1) of stretching circuits each connected to a respective detector except the first detector adjusted for detecting the smallest voltage level, to receive a said output signal therefrom, and each having output means to provide an output signal stretched at least as long temporally as said further output signals are delayed in relation to said detector output signals, (o) a plurality (n—1) of inhibitor devices each having first and second input means, said first input means being respectively connected to receive a said further output signal from each of said delay devices except from the nth delay device connected to the nth detector device adjusted for detecting the greatest voltage level, and said second input means being respectively connected to receive a said stretched output signal from each of said stretching circuits, each successive said second input means being connected to a stretching circuit receiving a said detector output signal from a detector adjusted to a progressively greater voltage level, (p) each said inhibitor device having output means for generating an output signal on receipt of a signal at said first input means only in the absence of a signal at said second input means, (q) and means connecting the output means of each of said inhibitor devices and the output means of said nth delay device to said timing circuit to provide the second input signal thereof.

8. A radar system according to claim 4, wherein said means (d) comprises:

(g) delay means connected to said transmitter for generating an output signal corresponding to but delayed in time relative to each of said outgoing pulses, (h) pulse stretching means connected to said receiving means for generating a stretched output signal corresponding to each of said return pulses, (i) an AND gate connected to said means (g) and (h) to receive said output signals therefrom and to emit a further output signal only upon simultaneous receipt of said output signals from means (g) and (h), (j) and means connecting said AND gate to said timing circuit to impress said further output signal as said first input signal on said timing circuit.

9. A radar system according to claim 5, wherein said means (d) comprises:

(m) delay means connected to said transmitter for generating an output signal corresponding to but delayed in time relative to each of said outgoing pulses, (n) pulse stretching means connected to said receiving means for generating a stretched output signal corresponding to each of said return pulses, (o) an AND gate connected to said means (g) and (h) to receive said output signals therefrom and to emit a further output signal only upon simultaneous receipt of said output signals from means (g) and (h), (p) and means connecting said AND gate to said timing circuit to impress said further output signal as said first input signal on said timing circuit.

10. A radar system according to claim 6, wherein said means (d) comprises:

(m) delay means connected to said transmitter for generating an output signal corresponding to but delayed in time relative to each of said outgoing pulses, (n) pulse stretching means connected to said receiving means for generating a stretched output signal corresponding to each of said return pulses, (o) an AND gate connected to said means (g) and (h) to receive said output signals therefrom and to emit a further output signal only upon simultaneous receipt of said output signals from means (g) and (h), (p) and means connecting said AND gate to said timing circuit to impress said further output signal as said first input signal on said timing circuit.

11. A radar system according to claim 7, wherein said means (d) comprises:

(r) delay means connected to said transmitter for generating an output signal corresponding to but delayed in time relative to each of said outgoing pulses, (s) pulse stretching means connected to said receiving means for generating a stretched output signal corresponding to each of said return pulses, (t) an AND gate connected to said means (g) and (h) to receive said output signals therefrom and to emit a further output signal only upon simultaneous receipt of said output signals from means (g) and (h), (u) and means connecting said AND gate to said timing circuit to impress said further output signal as said first signal on said timing circuit.

12. A radar system comprising:

(a) a radar transmitter including an antenna for directing outgoing pulses, (b) receiving means for detecting return pulses, (c) delay means connected to said transmitter for generating an output signal corresponding to but delayed in time relative to each of said outgoing pulses, (d) pulse stretching means connected to said receiving means for generating a stretched output signal corresponding to each of said return pulses,
(e) an AND gate connected to said means (c) and (d) to receive said output signals therefrom and to emit a further output signal only upon simultaneous receipt of said output signals from means (c) and (d),
(f) a timing circuit for determining the time interval between receipt of two input signals,
(g) means connecting said AND gate to said timing circuit for impressing a first input signal on said timing circuit,
(h) and further delay means connecting said receiving means to said timing circuit for impressing a second input signal on said timing circuit corresponding to but delayed in time relative to each of said return pulses,
(i) said timing circuit having an output signal proportional to the time interval between said input signals, whereby the last mentioned output signal is representative of the altitude of the altimeter.

13. A meter circuit comprising:
(a) input means for receiving an input voltage to be indicated,
(b) a plurality of voltage sensitive devices each connected to said input means to receive said input voltage and each having a terminal the voltage of which varies with said input voltage,
(c) a plurality of voltage limiting devices each connected to a respective one of said terminals to limit variation of the voltage thereon in a first direction, respective said voltage limiting devices being adjusted successively to limit said last mentioned voltage to progressively diminishing values,
(d) a plurality of meter movements each for indicating the current flow therethrough and each connected at a first side to a respective said terminal,
(e) a plurality of devices connected to each meter movement to limit the flow of current therethrough to the direction to produce a deflection therein,
(f) and a plurality of progressively diminishing voltage sources each connected to the second side of a respective said meter movement to cause each respective said meter movement to deflect in accordance with the difference in voltage between the voltage source and the output terminal between which such respective meter movement is connected.

14. A radar system according to claim 4, further including a meter circuit comprising:
(g) input means connected to said timing circuit for receiving said output signal therefrom as an input voltage to be indicated,
(h) a plurality of voltage sensitive devices each connected to said input means to receive said input voltage and each having a terminal the voltage of which varies with said input voltage,
(i) a plurality of voltage limiting devices each connected to a respective one of said terminals to limit variation of the voltage thereon in a first direction, respective said voltage limiting devices being adjusted successively to limit said last mentioned voltage to progressively diminishing values,
(j) a plurality of meter movements each for indicating the current flow therethrough and each connected at a first side to a respective said terminal,
(k) a plurality of devices connected to each meter movement to limit the flow of current therethrough to the direction to produce a deflection therein,
(l) and a plurality of progressively diminishing voltage sources each connected to the second side of a respective said meter movement to cause each respective said meter movement to deflect in accordance with the difference in voltage between the voltage source and the output terminal between which such respective meter movement is connected.

15. A radar system according to claim 7, further including a meter circuit comprising:
(r) input means connected to said timing circuit for receiving said output signal therefrom as an input voltage to be indicated,
(s) a plurality of voltage sensitive devices each connected to said input means to receive said input voltage and each having a terminal the voltage of which varies with said input voltage,
(t) a plurality of voltage limiting devices each connected to a respective one of said terminals to limit variation of the voltage thereon in a first direction, respective said voltage limiting devices being adjusted successively to limit said last mentioned voltage to progressively diminishing values,
(u) a plurality of meter movements each for indicating the current flow therethrough and each connected at a first side to a respective said terminal,
(v) a plurality of devices connected to each meter movement to limit the flow of current therethrough to the direction to produce a deflection therein,
(w) and a plurality of progressively diminishing voltage sources each connected to the second side of a respective said meter movement to cause each respective said meter movement to deflect in accordance with the difference in voltage between the voltage source and the output terminal between which such respective meter movement is connected.

16. A radar system according to claim 11, further including a meter circuit comprising:
(v) input means connected to said timing circuit for receiving said output signal therefrom as an input voltage to be indicated,
(w) a plurality of voltage sensitive devices each connected to said input means to receive said input voltage and each having a terminal the voltage of which varies with said input voltage,
(x) a plurality of voltage limiting devices each connected to a respective one of said terminals to limit variation of the voltage thereon in a first direction, respective said voltage limiting devices being adjusted successively to limit said last mentioned voltage to progressively diminishing values,
(y) a plurality of meter movements each for indicating the current flow therethrough and each connected at a first side to a respective said terminal,
(z) a plurality of devices connected to each meter movement to limit the flow of current therethrough to the direction to produce a deflection therein,
(aa) and a plurality of progressively diminishing voltage sources each connected to the second side of a respective said meter movement to cause each respective said meter movement to deflect in accordance with the difference in voltage between the voltage source and the output terminal between which such respective meter movement is connected.

No references cited.

RODNEY D. BENNETT, *Primary Examiner.*

J. P. MORRIS, *Assistant Examiner.*